(No Model.)
J. LEYSON & W. G. DALLING.
QUARTZ MILL BATTERY GUIDE.
No. 422,812. Patented Mar. 4, 1890.
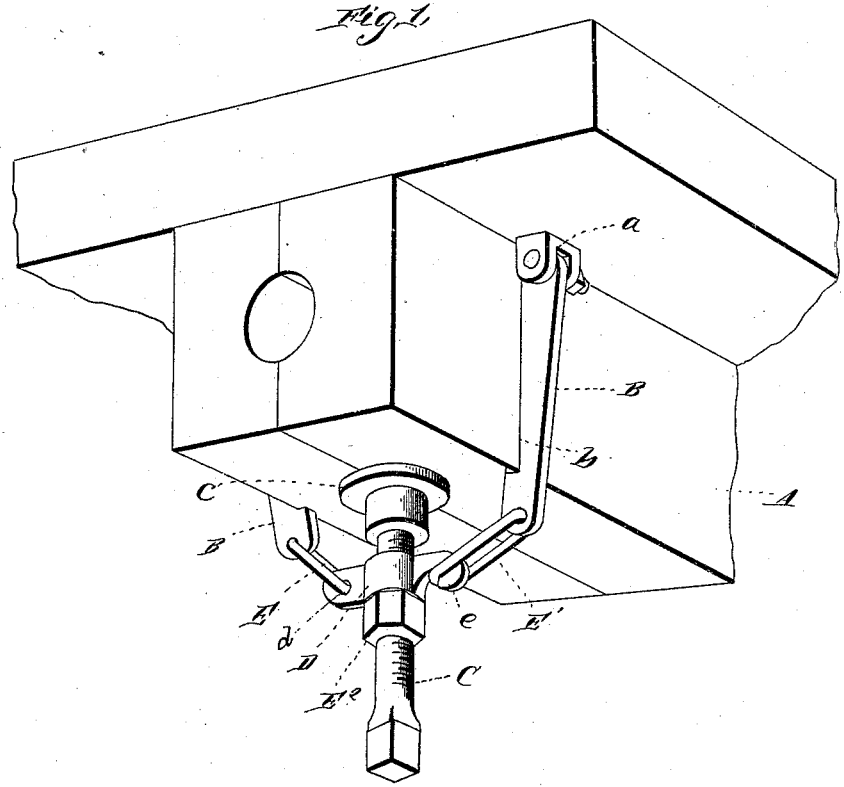
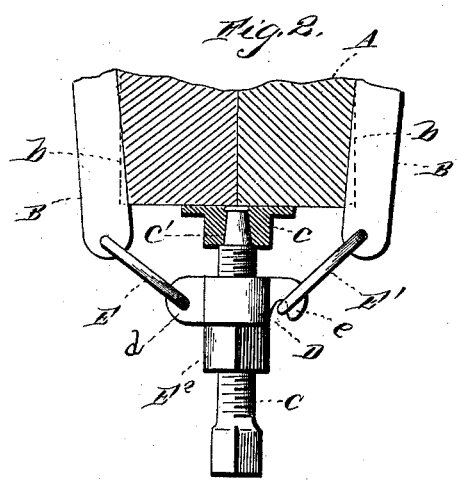
Witnesses
C. L. Taylor
P. C. Ulasi
Inventors
Joseph Leyson,
Wm. G. Dalling.
By their Attorney
E. W. Anderson

UNITED STATES PATENT OFFICE.

JOSEPH LEYSON AND WILLIAM G. DALLING, OF WALKERVILLE, MONTANA.

QUARTZ-MILL-BATTERY GUIDE.

SPECIFICATION forming part of Letters Patent No. 422,812, dated March 4, 1890.

Application filed November 20, 1889. Serial No. 330,953. (No model.)

*To all whom it may concern:*

Be it known that we, JOSEPH LEYSON and WILLIAM G. DALLING, citizens of the United States, residents of Walkerville, in the county of Silver Bow and State of Montana, have invented certain new and useful Improvements in Quartz-Mill-Battery Guides; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view, and Fig. 2 is a sectional detail view.

This invention pertains to certain improvements in stem-guides for ore crushers or batteries; and it consists of the novel combination and construction of parts, as will fully appear from the following description and illustration.

In carrying out our invention we employ, in connection with the sectional guide A for the stem of the stamp of an ore crusher or battery, (not shown,) two plate-like bars or jaws B B, which have pivot-bolt connection at their inner ends with eyebolts $a$ $a$, secured to a timber or cross piece of the supporting-frame of the crusher. These plate-like bars or jaws B stand edgewise to the transverse section of the guide-sections and are partially let into gains or grooves $b$ $b$ in the latter to prevent the accidental downward slipping of the guide-sections from any jarring action transmitted thereto from the stamp-stem. These grooves or gains incline outward at their bottoms to conform to the inclination or position of the bars or jaws B.

C is a screw having its inner end seated so as to turn in a disk or plate bearing $c$, said disk or plate having a socket or seat $c'$, which receives said end of the screw, thus permitting the plate or disk bearing, which rests or bears against the guide-sections across their meeting edges, to remain stationary and yet allow the screw to turn in said plate or disk.

D is a screw-threaded collar or nut fitted upon the screw C, and E E' are links, one connecting at its ends with the outer end of one plate-like bar or jaw B and an eye $d$ on one side of the collar or nut D. The other link E' connects at one end with the outer end of the opposite plate-like bar or jaw B, and engages at its free end with a hook $e$ upon the opposite side of the nut or collar D. The screw C is also fitted with a jam-nut $E^2$, engaging the collar or nut D, and also has upon its outer free end a head rectangular in cross-section for the application of a wrench thereto in manipulating the screw.

It will be seen from the foregoing that there will be no possibility of the guide-sections slipping from their normal position, as heretofore experienced, and in consequence of which they were required to be hammered back into position. Also, in removing or changing the guide-sections, when worn out or for other cause, it is only necessary to loosen the screw and disconnect the link having the hook from the collar, when the parts will hang or depend from the eyebolts connecting them to the timber or cross-piece of the supporting-frame.

Having described our invention, what we claim, and desire to secure by Letters Patent, is—

1. In a guide for stamp-stems of an ore-crusher, the combination, with the guide-sections having transverse grooves or gains, of the pivoted plate-like bars or jaws engaging said grooves or gains, and means for securing said bars or jaws together and in said grooves or gains, substantially as set forth.

2. The combination, with the guide-sections having the transverse grooves or gains, of the pivoted plate-like bars or jaws, the screw seated at one end in a disk or plate bearing, the screw-threaded collar or nut having an eye and a hook, and the links connecting with the said bars or jaws and said eye and hook, substantially as specified.

In testimony whereof we affix our signatures in presence of two witnesses.

JOSEPH LEYSON.
WILLIAM G. DALLING.

Witnesses:
WILLIAM H. FLEMMING,
W. I. LIPPINCOTT.